(No Model.)

A. CHEVALIE.
APPARATUS FOR COOKING EGGS.

No. 550,908. Patented Dec. 3, 1895.

Witnesses:
Jas. E. Hutchinson.
Thos. A. Gunn.

Inventor.
Alexander Chevalie,
By James L. Norris.
Atty.

UNITED STATES PATENT OFFICE.

ALEXANDRE CHEVALIÉ, OF CHICAGO, ILLINOIS.

APPARATUS FOR COOKING EGGS.

SPECIFICATION forming part of Letters Patent No. 550,908, dated December 3, 1895.

Application filed December 11, 1893. Serial No. 493,361. (No model.) Patented in England May 29, 1891, No. 9,102, and in France March 3, 1892, No. 209,896.

*To all whom it may concern:*

Be it known that I, ALEXANDRE CHEVALIÉ, a citizen of France, and a resident of Paris, now residing at Chicago, Illinois, have invented certain new and useful Improvements in Apparatus for Cooking Eggs, (for which Letters Patent No. 9,102, dated May 29, 1891, were granted in Great Britain, and No. 209,896, dated March 3, 1892, in France,) of which the following is a specification.

This invention relates to that class of devices more generally known as "egg boilers or cookers," and has for its object to provide an apparatus of this character wherein the egg-tray carrying the eggs will be automatically withdrawn or raised out of the water in which said eggs are being cooked or boiled when the water reaches a certain predetermined temperature—as, for instance, 158° Fahrenheit.

A further object of this invention is to combine with an egg-cooking apparatus of this or other construction means for automatically controlling or regulating the supply of heat used in heating the water contained in the reservoir or vessel in which the egg-tray is located.

To these ends my invention consists in the novel features of construction and new combinations of parts hereinafter described and then more definitely pointed out in the claims, forming a part of this specification.

In order to enable others to make, use, and construct my said invention, I will proceed to describe its several parts in detail, reference being made to the accompanying drawings, in which—

Figure 1:
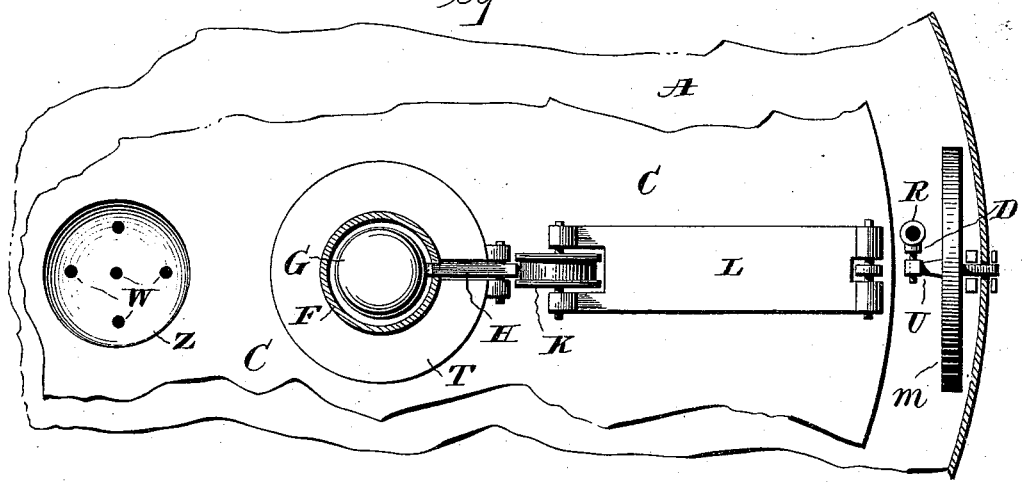
Figure 2:
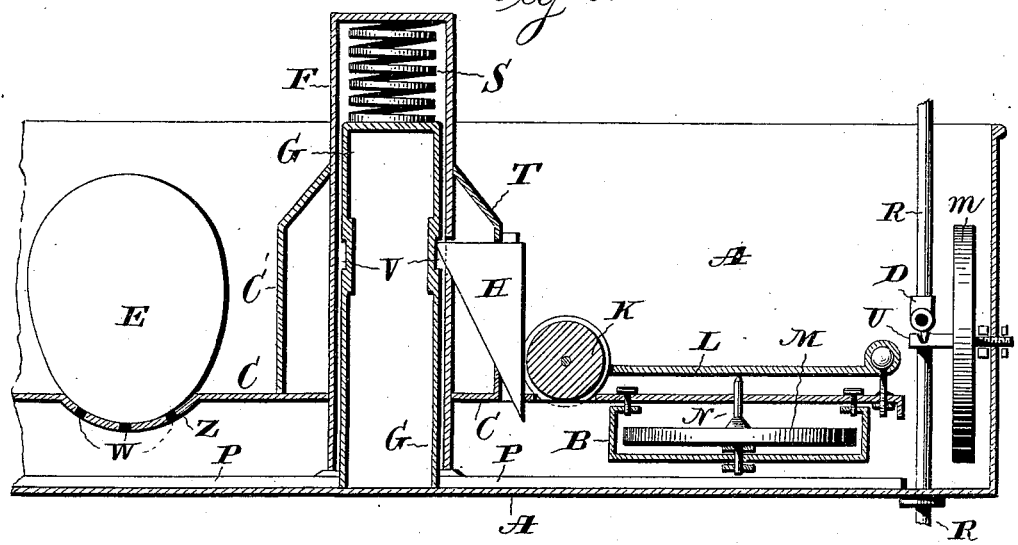

Figure 1 represents a plan view of a portion of my improved egg-boiler, and Fig. 2 represents a vertical sectional view of the same.

In the annexed drawings the reference-letter A designates a metallic vessel, preferably circular, but may be made in any desired shape or form to suit the conditions required, and provided with a cap or cover. (Not shown in the drawings.)

Within the vessel A and about the center thereof is located a dome G, which extends upward to a height about equal to the height of the sides of the vessel A, and is provided around its outer wall with a groove V, the purpose of which will be explained hereinafter.

This dome G has projecting outward from its lower portion three or more arms or feet P, which serve to firmly support the same within the vessel in an upright position. It will be understood that the dome is not in any manner connected or secured to the vessel A, but merely rests upon the bottom thereof, and may be removed or replaced at will for the purpose of cleaning, &c.

The reference-letter F designates a tube fitting loosely over the dome G and having attached at or near the lower portion thereof a circular or other suitably-shaped egg-tray C, provided with a series of concave depressions W, through which depressions are a series of orifices or holes Z to admit the water contained in the vessel through the same and around the eggs E, which rest in the concave depressions formed in the tray C, and may be further supported by the usual and ordinary wire rack. (Not shown in the drawings.) A casing C' is attached to the upper surface of the egg-tray C and surrounds the tube F, said casing being contracted at its upper portion, as at T, and attached to the tube F. The casing C', being secured at its lower portion to the tray C and at its upper part to the tube F, gives great strength and support to said tray.

To one side of the casing C' is pivoted an angular plate or trigger H, having one of its ends projecting through a slot in the casing and engaging with the groove V in the dome G. A spring S is located in the upper part of the tube F and rests upon the head of the dome G, said spring serving to normally keep the tube F and its attached egg-tray C in a raised position, except when held down by the trigger H.

To the under side of the egg-tray C is attached a bracket B, carrying a closed vessel M, in which is placed a quantity of liquid capable of expanding when subjected to certain degrees of heat. This vessel is preferably formed of thin metal and may, if desired, be corrugated, so as to give a greater degree of expansion. To the upper surface of the vessel M is attached a needle N, which passes through a recess in the egg-tray and extends upward a slight distance above the same. Resting upon the needle N is a plate L, pivoted or hinged at its outer end to the egg-tray C, and having its opposite end forked or bifurcated, in which is journaled a flanged roller K, serving to act upon the trigger H.

The operation of the apparatus as thus far described may be explained as follows: The eggs E are placed upon the egg-tray C over the concave depressions and preferably with their small ends down. The tube F, with the tray C attached thereto, is now depressed against the tension of the spring S until the point of the triangular plate or trigger H engages with the groove V in the dome G, while at the same time the roller K, journaled in the end of the hinged plate L, rides along one edge of said trigger and serves to keep the same in engagement with the notch V, and holding the egg-tray in its depressed position within the vessel A, which has been previously partially filled with water. The vessel A is now subjected to heat, preferably through the medium of a gas-burner, but not necessarily so, and when the oil within the vessel M reaches a certain degree of heat, as 158° Fahrenheit, which is imparted thereto by the heated water, the upper plate of said vessel expands, raising the needle N and with it the hinged plate L, and releasing the trigger H, whereupon the tube F and egg-tray C, carrying the eggs, are automatically raised through the medium of the springs S from out of the water and the cooking operation thereby stopped.

The water in the vessel A is preferably heated by gas, and for this purpose I have combined with the above-described egg-cooker a device for automatically cutting off the supply of gas when the water reaches a certain temperature and thereby stopping the cooking operation. This latter-named attachment consists of a closed vessel $m$, filled with oil and constructed substantially like the vessel M previously described, and is located within and preferably attached to the main vessel A, outside of the circular egg-tray C. To one side of the vessel $m$ is secured an arm U, provided with a rack or teeth which mesh with a pinion D, secured to the stem of a valve controlling the supply of gas issuing through the gas-pipe R.

The operation of the gas regulator or cut-off is substantially like that of the egg-tray raiser. When the water within the main vessel A reaches a temperature of 158° Fahrenheit, or thereabout, the oil within the closed vessel $m$ immediately begins to expand, forcing the arm U outward, and through the medium of the rack and pinion the valve within the gas-supply pipe R is closed and the gas thereupon cut off. It will be obvious that these two attachments or regulators may be used independently or together. The apparatus may likewise be made from any suitable material and in any preferred design, so as to be used upon a dining-room or other table, if desired.

What I claim is—

1. In an egg-cooking apparatus, the combination with the vessel A, of a dome seated within said vessel and having a groove therein near the top, a spring raised tube fitted over and inclosing the dome, and having a slot in one side thereof, an egg-tray secured to the lower portion of the tube, and a trigger secured to the tube above the tray, a closed vessel secured to the under side of the tray and filled with an expansible liquid, a needle secured to the top of said vessel and projecting through an orifice in the tray, and a plate hinged to the upper side of the tray, and resting upon said needle, the forward end of said plate engaging with the trigger, substantially as described.

2. In an egg-cooker, the combination with the vessel A and dome G, of a spring raised tube F loosely fitting over said dome and carrying an egg-tray C, a casing C′, carrying a trigger H, said trigger being adapted to engage with the tube, an expansible vessel M secured to the under side of the egg-tray, a needle attached to the upper side of said vessel, and a hinged plate L resting upon said needle and carrying a roller K at its free end, said roller acting upon the trigger, substantially as described.

3. In an egg-cooking apparatus, the combination with the vessel A, of a removable dome G seated within said vessel and provided with laterally projecting arms at its base, and a circumferential groove near its top, a tube F slightly longer than said dome, and fitting loosely over the same, a spring S located within the space between the top of the dome and tube, a casing C′, secured to and inclosing the tube, a slot in said casing, an angular trigger pivoted to the casing and working in said slot, one point of said trigger engaging with the groove in the dome, an egg-tray C, secured to the lower portion of said casing and tube, and provided with a series of perforated depressions, a closed vessel $m$ secured to the under side of said tray and having a needle N projecting upward from the top thereof and passing through an aperture in said tray, a plate L hinged to the tray and resting upon said needle, a roller K journaled in the free end of the plate and adapted to act upon the trigger, as and for the purpose set forth.

4. In an egg-cooking apparatus, the combination with a suitable vessel, of a dome resting within said vessel, a spring raised tube fitting over said dome and carrying a trigger engaging with the dome and holding said tube depressed, an egg-tray carried by the tube, a closed vessel secured to the tray and filled with an expansible fluid, a connection between said closed vessel and the trigger whereby the latter is released from engagement with the dome when the liquid expands, substantially as described.

ALEXANDRE CHEVALIÉ.

Witnesses:
WILLIAM PORT,
EDWARD R. PORT.